United States Patent [19]
Fenollar

[11] 3,854,029

[45] Dec. 10, 1974

[54] METHOD AND APPARATUS FOR REPAIRING SHEET ELEMENTS OF AUTOMOBILES BODIES

[76] Inventor: Theodore Robert Fenollar, 12 Cours du Medoc, 33300 Bordeaux, France

[22] Filed: Dec. 10, 1973

[21] Appl. No.: 423,244

[52] U.S. Cl. ............................................. 219/149
[51] Int. Cl. ........................... A05b 3/00, B21j 1/06
[58] Field of Search ........ 219/50, 149; 72/342, 364

[56] References Cited
UNITED STATES PATENTS

| | | | |
|---|---|---|---|
| 1,351,909 | 9/1920 | Johnson | 219/50 |
| 2,027,416 | 1/1936 | Blakeslee | 219/50 |
| 2,227,476 | 1/1941 | Williams et al. | 72/342 X |

*Primary Examiner*—J. V. Truhe
*Assistant Examiner*—Kenneth Hairston
*Attorney, Agent, or Firm*—Waters, Roditi, Schwartz & Nissen

[57] ABSTRACT

A method and apparatus for repairing sheet elements of automobile bodies, which have been hammered into shape, to smoothen such elements, comprising effecting instantaneous electrical heating of the sheet element in a sufficiently local region thereof to prevent deformation of the sheet, and alternating the heating of the sheet with cooling. The electrical heating is effected by connecting the sheet element into an electrical circuit with an electrode facing the element. The cooling is effected with water. A manual control element is utilized to close the electrical circuit and also to bring the electrode into operative position with respect to the sheet element.

3 Claims, 2 Drawing Figures

METHOD AND APPARATUS FOR REPAIRING SHEET ELEMENTS OF AUTOMOBILES BODIES

BACKGROUND

1. Field of the Invention

The present invention relates to the repair of elements of automobile bodies and more particularly to the straightening of damaged sheets.

2. Prior Art

At present, the repair of elements of car bodies is effected in two distinct operations:

1. repair and straightening of the sheet by hammering to correct the deformation,
2. retreating deformed parts due to hammering.

The second operation is effected by local heating of the sheet by means of a blow torch followed by a rapid general humidification by the use of a wet sponge. The local heating is not instantaneous and is effected over a relatively significant surface area and causes local deformation in the region surrounding the heated area and particularly for thin sheets. In practice, the repair frequently becomes impossible and leads to the replacement of the complete element.

SUMMARY OF THE INVENTION

An object of the invention is to provide a method and apparatus by which sheet elements of automobile bodies can be repaired without the disadvantages associated with the prior art techniques.

A characteristic feature of the method of the invention is to provide an instantaneous heating of very reduced areas of the sheet in such manner to eliminate all deformation. This rapid local heating is alternated with water cooling to permit treatment of very delicate parts without any deformation whatsoever. According to another characteristic feature of the method of the invention, an electrical circuit of very high intensity is formed in which the part to be repaired is connected as one electrode while a carbon element of appropriate reduced section forms the opposite electrode. The circuit further includes relays, switches, and a transformer to permit utilization of different voltages in different areas with complete safety for the operator.

When the carbon electrode enters into contact with the sheet element, by reason of the difference of conductivity therebetween, the electrode causes instantaneous heating of the metal sheet in the small area thereof corresponding to the carbon electrode.

By the use of a plurality of such heating operations in the zone to be repaired, in alternation with water cooling, the sheet element retains its form while undergoing very local and measured reduced expansions.

The invention will hereafter be described with reference to the appended drawing which illustrates one embodiment of the invention by way of example only.

DETAILED DESCRIPTION

Figure 1:
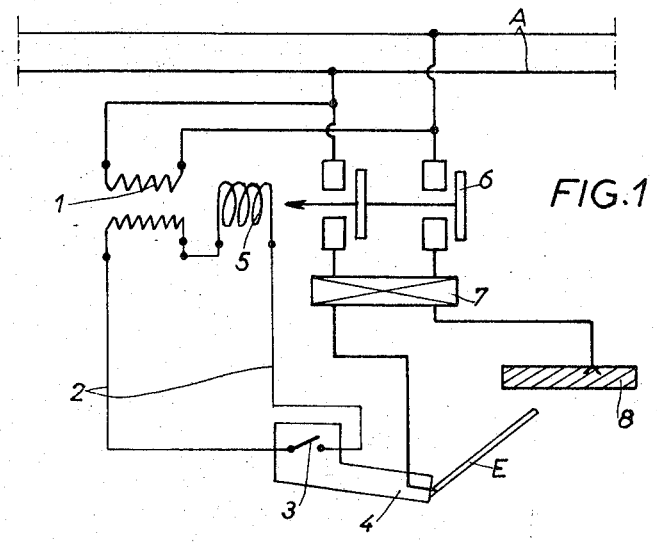
FIG. 1 is a schematic view illustrating the apparatus according to the invention in inoperative condition.

Referring to the drawing, therein is illustrated apparatus according to the invention comprising two distinct electrical circuits, namely a low intensity control circuit and a high intensity operating circuit. The low intensity circuit serves for manual control of the high intensity circuit which directly incorporates as one electrode the element to be repaired.

The low intensity control circuit is connected to supply lines A and includes a transformer 1 which can produce low voltages. An output line 2 of the transformer 1 is connected to a microswitch 3 mounted in a handle 4 which can be manually operated to close switch 3. A coil 5 of a relay is connected between the output of the transformer and the switch 3 so that when switch 3 is closed, the coil 5 is energized to close contact 6 of the relay.

The high intensity circuit is directly connected to the supply lines A and includes a working transformer 7 whose connection to the supply lines is controlled by contact 6 of the relay. The output terminals of transformer 7 are connected respectively on the one hand to the element 8 to be repaired and on the other hand to an electrode E through the intermediary of handle 4. The electrode E is preferably made of carbon and includes a replaceable working element.

According to the invention, the circuit is closed between electrode E and the element 8 solely by manual operation of handle 4 to close the switch 3. This arrangement serves as a safety means and minimizes risk of unintended circuit closure while also permitting close control of the duration of heating of the element 8 at the point of contact thereof. The closure of switch 3 by handle 4 may be indicated by suitable means such as by production of an illumination signal or an audible signal.

The apparatus can also include a thermal switch which opens the relay in case of excessive current in the feed circuit to interrupt supply to the electrode and element 8. A voltage divider can also be employed to permit the apparatus to be connected to supply lines of different voltage. The apparatus is contained in an insulated enclosure (not shown).

In operation, the sheet element 8 which is to be repaired is placed into position facing electrode E such that when the electrode is brought into contact with the sheet element 8 such contact will be at a location where the sheet element is to be smoothened. The sheet element is then connected to the working transformer 7 and the electrode E is then brought into contact with element 8 by manual operation of handle 4. This will produce closure of switch 3 which will energize transformer 7 and produce intensive local heating in the region of the element 8 where the electrode E makes contact therewith. After sufficient heating as determined by the operator and dependent on the magnitude of smoothening which is to be undertaken and the thickness of sheet element 8, the handle 4 is released and returned to the position as shown in FIG. 1 either manually or by means of a recall spring, and then the surface of the sheet element is cooled by any suitable means and preferably with a wet sponge or the like. The operation is repeated as necessary at the locations at which smoothening is desired and due to the fact that smoothening is effected in a relatively restricted area and the sheet element does not undergo deformation outside of the region where the heat is applied, a smooth repair can be rapidly made. The operating details involving such factors as voltage values, size of electrode E, time of heating, time of cooling, temperature of heating and the like are all readily determinable by those skilled in the art and depend upon such factors as thickness of sheet element 8 and degrees of irregularities which are to be eliminated. With the apparatus illustrated in FIGS. 1 and 2, those skilled in the art will be readily able to achieve the effects of the invention without any undue experimentation and solely by the most elementary trial and error processes.

Figure 2:
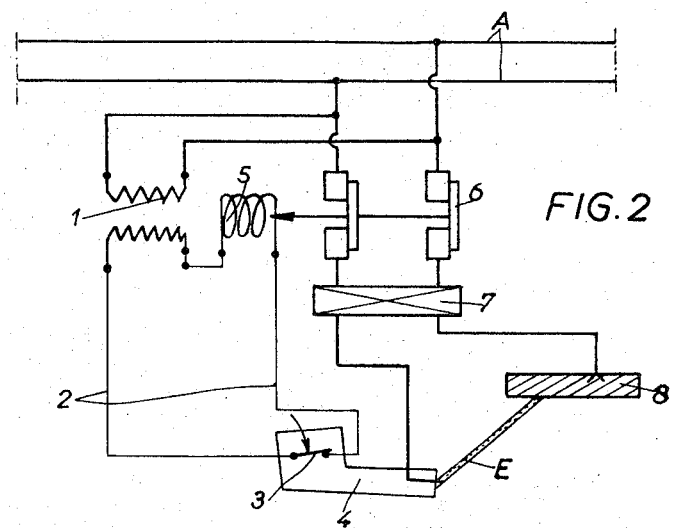
FIG. 2 is a view similar to FIG. 1 showing the apparatus in operative condition.

Solely by way of example however, the apparatus in FIGS. 1 and 2 has been operated under the following conditions.

Voltage: 220-230V single phase at the primary in transformer 6
3 – 6V at the secondary.
Sheet 8: iron and its alloys, steel, copper and its alloys, or aluminum of a thickness between about 0.1 and 2 mm.
Treatment area: an area of sheet 8 of a diameter of about 0.1 mm to 30 mm, repetitive after cooling of the preceding area of contact.
Temperature: This is a function of the different material being treated,
steel 800°-900°C
copper 500°-550°C
aluminum 400°-450°C The sheet to be treated is first cleaned to the bare metal with an abrasive disc or the like after which the electrode is lightly and rapidly applied to the damaged region to be repaired to obtain a temperature which varies according to the thickness of the sheet and its structure. The contact region is cooled with a wet sponge and the operation is repeated until the damage has been removed.

This procedure permits removal of damage areas and gives to the panels its original rigidity and even provides internal extra reinforcement. This permits operation with very thin sheets.

The invention is not limited to the disclosed embodiments but embraces all variations and modifications thereof which fall within the spirit and scope of the invention as defined by the appended claims.

What is claimed is:

1. A method of repairing sheet elements of automobile bodies, which have been hammered into shape, to smoothen such elements, said method comprising effecting instantaneous electrical heating of the sheet element in a sufficiently local region thereof to prevent deformation of the sheet, and alternating the heating of the sheet element with cooling, said heating being effected by connecting the sheet element to a first electrode of a high-intensity electrical circuit, supporting a second electrode of said circuit by a portable operator-carried element, and moving said portable element so that the second electrode is brought into and maintained in direct contact with said sheet element to effect localized heating of said sheet element at the location where it is contacted by said second electrode.

2. A method as claimed in claim 1 wherein the cooling is effected with water.

3. A method as claimed in claim 1 comprising connecting said high-intensity circuit to a control circuit which selectively makes and breaks said high-intensity circuit, and providing said control circuit with an actuator switch which is carried by said portable element.

* * * * *